United States Patent
Lin et al.

(10) Patent No.: US 10,007,315 B2
(45) Date of Patent: Jun. 26, 2018

(54) ELECTRONIC DEVICE AND METHOD OF PREVENTING ELECTRONIC DEVICE FROM ENTERING HIBERNATION

(71) Applicants: Maintek Computer (Suzhou) Co., Ltd., JiangSu (CN); PEGATRON CORPORATION, Taipei (TW)

(72) Inventors: Meng-Chih Lin, Taipei (TW); Rui Zhang, JiangSu (CN); Xiu-Ling Fu, JiangSu (CN)

(73) Assignees: Maintek Computer (Suzhou) Co., Ltd., Jiangsu (CN); Pegatron Corporation, Taipei (TW)

( * ) Notice: Subject to any disclaimer, the term of this patent is extended or adjusted under 35 U.S.C. 154(b) by 205 days.

(21) Appl. No.: 15/063,857

(22) Filed: Mar. 8, 2016

(65) Prior Publication Data
US 2016/0274631 A1   Sep. 22, 2016

(30) Foreign Application Priority Data
Mar. 19, 2015   (CN) .......................... 2015 1 0122051

(51) Int. Cl.
*G06F 1/00*   (2006.01)
*G06F 1/26*   (2006.01)
*G06F 1/32*   (2006.01)

(52) U.S. Cl.
CPC .......... *G06F 1/3203* (2013.01); *G06F 1/3209* (2013.01); *G06F 1/3218* (2013.01); *G06F 1/3246* (2013.01)

(58) Field of Classification Search
CPC .................................... G06F 1/26; G06F 1/32
See application file for complete search history.

(56) References Cited

U.S. PATENT DOCUMENTS

| | | | | |
|---|---|---|---|---|
| 2003/0112585 A1* | 6/2003 | Silvester | ............... | G06F 1/1616 361/679.41 |
| 2009/0044028 A1* | 2/2009 | Wong | ...................... | G06F 1/266 713/300 |
| 2009/0147945 A1* | 6/2009 | Doi | ......................... | H04L 9/002 380/2 |
| 2011/0169840 A1* | 7/2011 | Bakalash | ................... | G06T 1/00 345/505 |

(Continued)

FOREIGN PATENT DOCUMENTS

TW   I379190 B1   12/2012
TW   201445319 A   12/2014

*Primary Examiner* — Phil Nguyen
(74) *Attorney, Agent, or Firm* — Muncy, Geissler, Olds & Lowe, P.C.

(57) ABSTRACT

An electronic device connects to an external host. The electronic device is configured to execute a first operating system and the external host is configured to execute a second operating system. The electronic device comprises a display switching unit, a switch unit and a power unit. The display switching unit is capable of receiving an external display signal from the external host to output a first switching signal. The switch unit is coupled to the display switching unit to output a first voltage control signal according to the first switching signal. The power unit is coupled to the switch unit to output a first voltage to the display switching unit according to the first voltage control signal to cause the electronic device to keep displaying the user interface of the second operating system.

8 Claims, 4 Drawing Sheets

(56) References Cited

U.S. PATENT DOCUMENTS

| | | | |
|---|---|---|---|
| 2012/0173902 A1* | 7/2012 | Zawacki | G06F 1/1632 713/320 |
| 2012/0235971 A1* | 9/2012 | Zou | G06F 1/3218 345/211 |
| 2013/0346776 A1* | 12/2013 | Wang | G06F 3/14 713/323 |
| 2014/0122749 A1 | 5/2014 | Ting | |
| 2015/0033047 A1* | 1/2015 | Byun | G06F 1/3206 713/320 |
| 2016/0117793 A1* | 4/2016 | Sierra | G06T 1/20 345/502 |

* cited by examiner

ELECTRONIC DEVICE AND METHOD OF PREVENTING ELECTRONIC DEVICE FROM ENTERING HIBERNATION

CROSS REFERENCE TO RELATED APPLICATIONS

This Non-provisional application claims priority under 35 U.S.C. § 119(a) on Patent Application No(s). 201510122051.6 filed in People's Republic of China on Mar. 19, 2015, the entire contents of which are hereby incorporated by reference

BACKGROUND

Technical Field

The invention relates to an electronic device and a method for preventing an electronic device from entering hibernation.

Related Art

With advanced technology, computer applications are popular and widespread. At work or in daily routines, computers are indispensable auxiliary tools. Nowadays, users need powerful computers and they are not satisfied with the computers which are limited to merely a single operating system.

In current technology, one host computer can switch to display the user interface of the operating system on the other computer. However, in displaying, the system or some components of the host computer may enter hibernation if idling for too long.

Regarding ACPI (Advanced Configuration and Power Interface) specification, power state S3 is referred to as sleep mode, and power state S4 is hibernation mentioned above. Sleep mood is also called STR (Suspend to RAM). When the computer enters sleep mode, the contents for execution are written into its random access memory and then the hard disk is powered off. To wake the computer from sleep mode, the user needs to move external device (e.g. mouse). Hibernation is also called STD (Suspend to Disk). When the computer enters hibernation, the contents of its random access memory is saved to the hard disk and then the power is turned off. Thus, the computer stop working and like a regular shutdown. To wake the computer from hibernation, the user needs to press the power button first, then the computer restores the contents in the hard disk into the random access memory, and the internal system is exactly as it was before entering hibernation.

Moreover, when the computer entering hibernation, most components especially the components related to displaying function in the computer are powered down. Thus, if the computer is used for merely displaying (display mode), the display can not operate well because the components related to displaying function in the computer are powered down.

SUMMARY

An aspect is to provide an electronic device and a method which prevent the system or a component of the electronic device from entering hibernation, or do not turn off the required power for display mode even if the electronic device enters hibernation.

An electronic device connects to an external host. The electronic device is configured to execute a first operating system and the external host is configured to execute a second operating system. The electronic device comprises a display switching unit, a switch unit and a power unit. The display switching unit is capable of receiving an external display signal from the external host to output a first switching signal. The switch unit is coupled to the display switching unit to output a first voltage control signal according to the first switching signal. The power unit is coupled to the switch unit to output a first voltage to the display switching unit according to the first voltage control signal to cause the electronic device to keep displaying the user interface of the second operating system.

In one embodiment, the magnitude of the first voltage is constant.

In one embodiment, the electronic device further comprises a processing unit. The processing unit is coupled to the display switching unit and capable of outputting an internal display signal to the display switching unit to cause the electronic device to display the user interface of the first operating system.

In one embodiment, when the display switching unit receives the internal display signal, the display switching unit outputs a second switching signal, the switch unit outputs a second voltage control signal according to the second switching signal, and the power unit outputs a second voltage to the display switching unit according to the second voltage control signal.

In one embodiment, the magnitude of the second voltage is variable.

In one embodiment, when the switch unit receives the first switching signal, the switch unit chooses to output the first voltage control signal. When the switch unit receives the second switching signal, the switch unit chooses to output the second voltage control signal.

In one embodiment, when the display switching unit receives the external display signal, the display switching unit outputs the first switching signal but does not output the second switching signal.

In one embodiment, the electronic device further comprises a control unit. The control unit is coupled to the switch unit. The second voltage control signal comes from the control unit.

In one embodiment, the control unit is an embedded controller.

In one embodiment, the display switching unit is a graphics card or a graphics processing unit.

A method for preventing an electronic device from entering hibernation after the electronic device receives an external display signal from an external host is executed by a control unit of the electronic device. The method comprises: if receiving a sleep instruction, executing the sleep instruction to cause the electronic device to enter sleep mode; and if receiving a hibernating instruction, keeping the electronic device in sleep mode.

In one embodiment, if the electronic device has been in sleep mode more than a designated period of time, keep the electronic device in sleep mode.

In summary, when the electronic device according to the embodiments switches to display mode for displaying the user interface of the operating system on the external host, a certain component (e.g. the display switching unit) is prevented from entering hibernation so as to display well, save waking time, save hard disk space and improve working efficiency, etc.

In another embodiment, the method for preventing the electronic device from entering hibernation allows the electronic device to enter sleep mode when receiving the sleep instruction, and keeps the electronic device in sleep mode if the electronic device has been in sleep mode over a long period of time or receives the hibernating instruction. Thus, its system is prevented from entering hibernation so as to save waking time, save hard disk space and improve working efficiency, etc.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION

The embodiments of the invention will be apparent from the following detailed description, which proceeds with reference to the accompanying drawings, wherein the same references relate to the same elements.

Figure 1A:
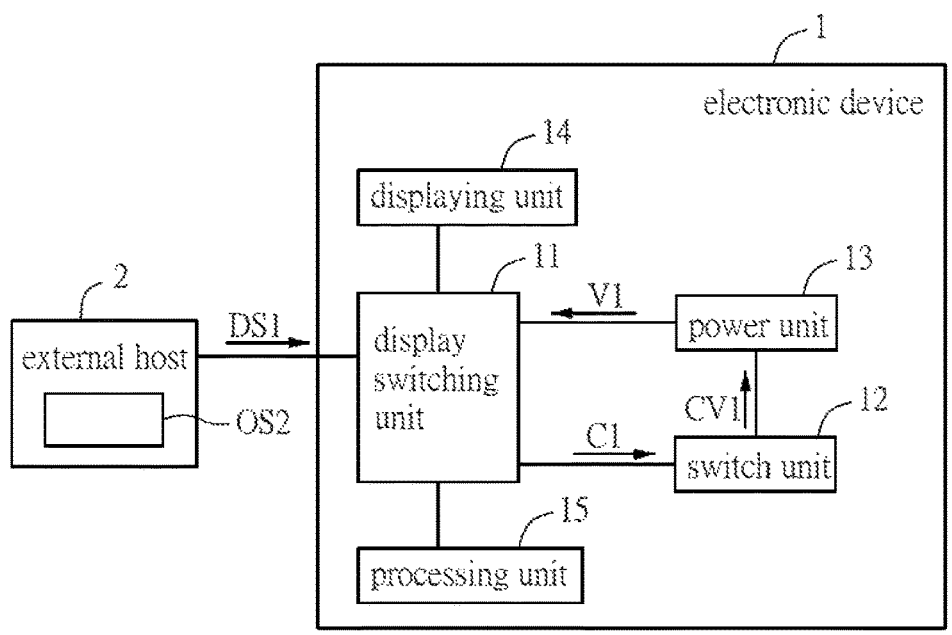
FIG. 1A is a schematic diagram showing the electronic device and the external host according to an embodiment.
Figure 1B:
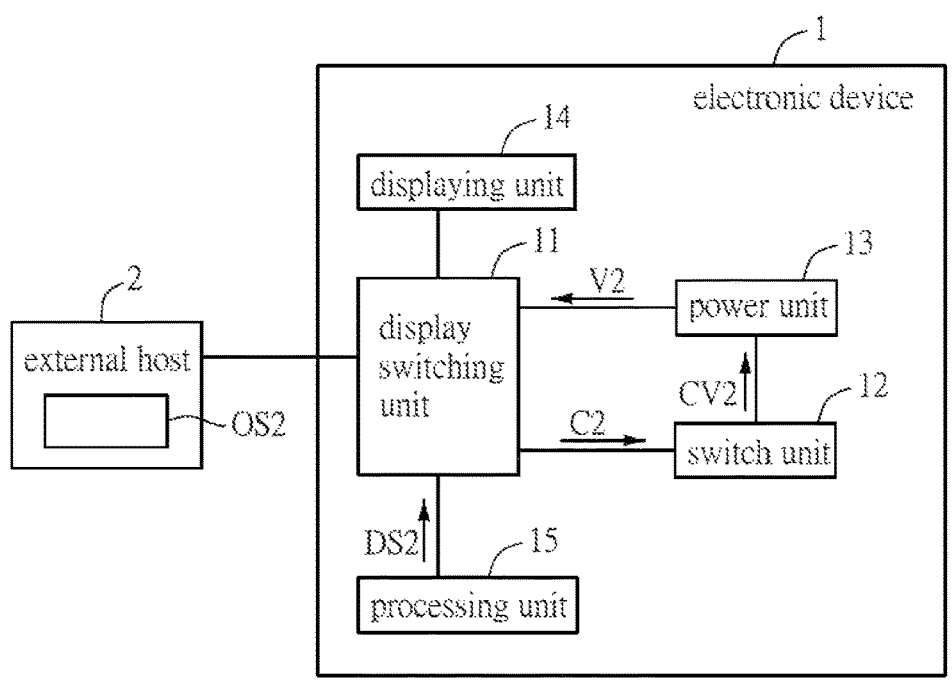
FIG. 1B is a schematic diagram showing another state of the electronic device and the external host in FIG. 1A.

FIG. 1A is a schematic diagram showing the electronic device 1 and the external host 2 according to an embodiment. FIG. 1B is a schematic diagram showing another state of the electronic device and the external host in FIG. 1A. Before explanation, the electronic device 1 in FIG. 1A runs in "display mode" (the electronic device 1 is configured to display the user interface of the operating system on the external host 2), and the electronic device 1 in FIG. 1B runs in "regular working mode". Other related description will be described later.

Referring to FIG. 1A, the electronic device 1 connects to the external host 2. The term "connect" is referred to signal connection through physical signal line or wireless signal connection between the electronic device 1 and the external host 2. In the embodiment, the electronic device 1 is a computer and the external host 2 is a computer for example. However, they are not limited thereto. In other embodiments, the electronic device 1 or the external host 2 may be a handheld mobile communication device for example.

The electronic device 1 is configured to execute the first operating system (not shown in the figure), and the external host 2 is configured to execute the second operating system OS2. The first operating system and the second operating system OS2 are not limited to the same operating system or families of operating systems. For example, the first operating system is Microsoft Windows, and the second operating system OS2 is Apple OS X.

In the embodiment, the electronic device 1 comprises a display switching unit 11, a switch unit 12 and a power unit 13. The switch unit 12 is respectively coupled to the display switching unit 11 and the power unit 13. In the embodiment, the display switching unit 11 may be a graphic card, a graphics processing unit or other component with equivalent functions. The display switching unit 11 controls the displaying unit of the electronic device 1, for example a display screen, to cause the display screen to perform displaying function.

The display switching unit 11 is capable of receiving the external display signal DS1 from the external host 2. In the embodiment, the external display signal DS1 may be a signal for displaying the user interface of the second operating system OS2. Upon receiving the external display signal DS1, the display switching unit 11 outputs the first switching signal C1 to the switch unit 12. Then, the switch unit 12 outputs the first voltage control signal CV1 to the power unit 13 according to the first switching signal C1. Then, the power unit 13 outputs the first voltage V1 to the display switching unit 11 according to the first voltage control signal CV1. In the embodiment, the magnitude of the first voltage V1 is constant. The first voltage V1 serves as the power source for the display switching unit 11.

Furthermore, the display switching unit 11 may be coupled to a displaying unit 14 of the electronic device 1. In the embodiment, the displaying unit 14 may be a display. If the display switching unit 11 is provided with the power source, the display switching unit 11 can control the displaying unit 14 to cause the displaying unit 14 to regularly perform displaying function.

As a whole, when the display switching unit 11 of the electronic device 1 receives the external display signal DS1, the display switching unit 11 switches to display mode (the electronic device 1 is configured to display the user interface of the second operating system OS2). In the embodiment, by the switch unit 12 in the electronic device 1, the power unit 13 can stably supply power to the display switching unit 11. As a result, when the electronic device 1 switches to display mode, the display switching unit 11 keeps powered and does not enter the hibernating state so the electronic device 1 keeps displaying the user interface of the second operating system OS2. In other words, whether the operating system on the electronic device 1 enters sleep mode or the hibernating state, the power supplying status for the display switching unit 11 is unaffected.

Moreover, the electronic device 1 may further comprises a processing unit 15 coupled to the display switching unit 11. The processing unit 15 may be a CPU (central processing unit) for computer.

Then, referring to FIG. 1B, when the processing unit 15 outputs a internal display signal DS2 to the display switching unit 11 namely the electronic device 1 switches to regular working mode, the displaying unit 14 of the electronic device 1 is configured to display the user interface of the first operating system. The internal display signal DS2 may be the signal for displaying the user interface of the first operating system.

In the embodiment, when the display switching unit 11 receives the internal display signal DS2 coming from the processing unit 15, the display switching unit 11 outputs a second switching signal C2 to the switch unit 12. Then, the switch unit 12 outputs a second voltage control signal CV2 to the power unit 13 according to the second switching signal C2. Then, the power unit 13 outputs a second voltage V2 to the display switching unit 11 according to the second voltage control signal CV2. Because currently the electronic device 1 operates in working mode with regular power control, the magnitude of the second voltage V2 may be variable and the second voltage V2 similarly can serve as the power source for the display switching unit 11. Therefore, the displaying unit 14 can regularly display the user interface of the first operating system.

Moreover, when the display switching unit 11 of the electronic device 1 concurrently receives the external display signal DS1 (FIG. 1A) and the internal display signal DS2 (FIG. 1B), the display switching unit 11 outputs the first switching signal C1 but does not accordingly output the second switching signal C2. For example, the display switching unit 11 puts a high priority on a response to the external display signal DS1. Thus, the display switching unit 11 will not generate the second switching signal C2.

Figure 2:
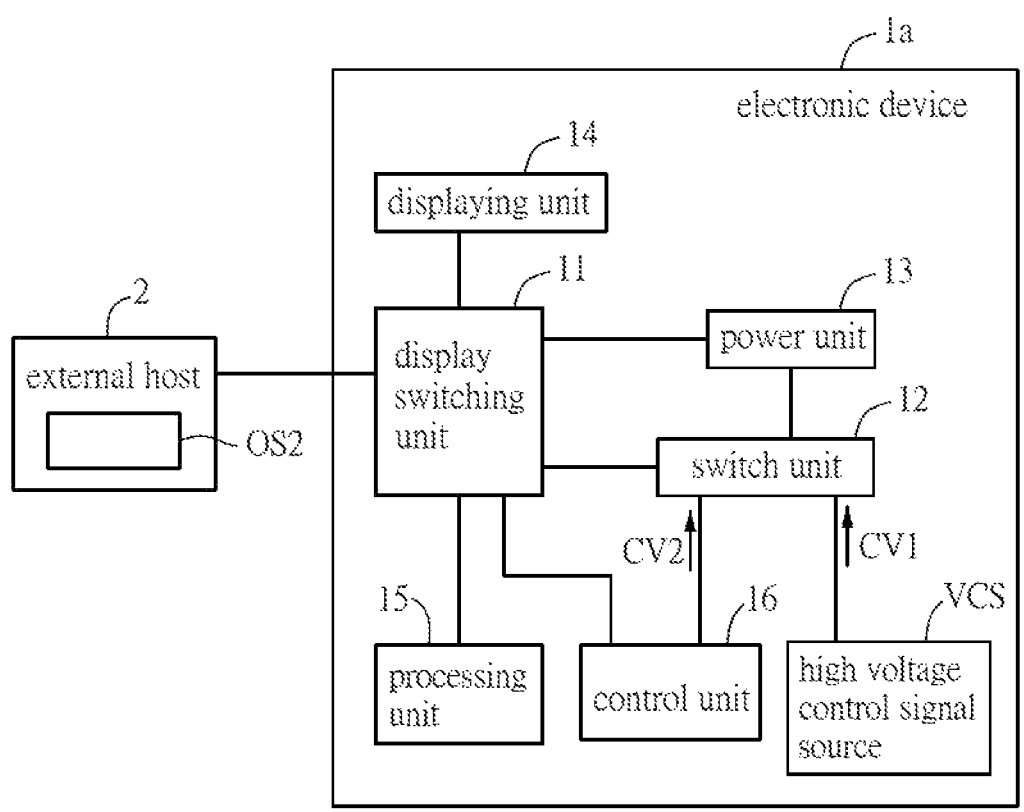
FIG. 2 is a schematic diagram showing the electronic device and the external host according to another embodiment.

Then, referring to FIG. 2, FIG. 2 is a schematic diagram showing the electronic device 1a and the external host 2 according to another embodiment. In the embodiment, the switch unit 12 serves as an output signal selector. For example, the switch unit 12 has three input terminals and one output terminal. One of the terminals is configured to receive the switching signal outputted from the display switching unit 11. The switching signal indicates which mode the electronic device 1 is currently in (display mode or regular working mode). Other two input terminals are configured to respectively receive the first voltage control signal CV1 and the second voltage control signal CV2. The first voltage control signal CV1 may come from a high voltage control signal source VCS, and the second voltage control signal CV2 may come from a control unit 16. The control unit 16 may be an embedded controller and coupled to the switch unit 12. In the embodiment, when the switch unit 12 receives the first switching signal C1 (like FIG. 1A), the switch unit 12 chooses to output the first voltage control signal CV1 coming from the high voltage control signal source VCS to the power unit 13. When the switch unit 12 receives the second switching signal C2 (like FIG. 1B), the switch unit 12 chooses to output the second voltage control signal CV2 coming from the control unit 16 to the power unit 13. Because other subsequent actions can refer to the previous description, they are not repeated here.

Moreover, in the embodiment, the display switching unit 11 is also coupled to the control unit 16. Thus, according to the type of the received signal (the external display signal or the internal display signal), the display switching unit 11 let the control unit 16 know which mode the electronic device 1 is placed in (display mode or regular working mode). Then, the control unit 16 controls which switching signal (the first switching signal or the second switching signal) is outputted by the display switching unit 11 to the switch unit 12.

Figure 3:
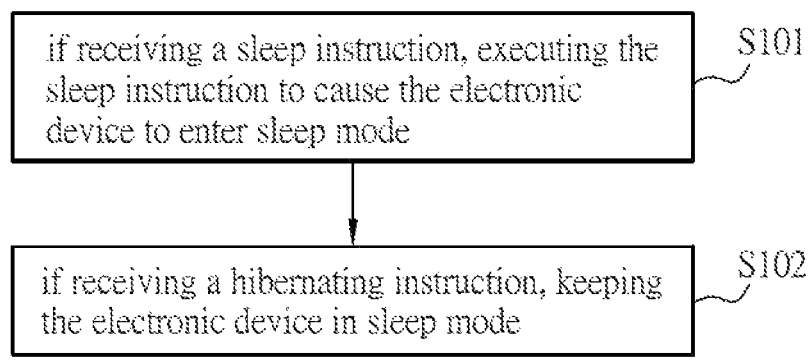
FIG. 3 is a flow chart of the method for preventing the electronic device from entering hibernation according to an embodiment.
Figure 4A:
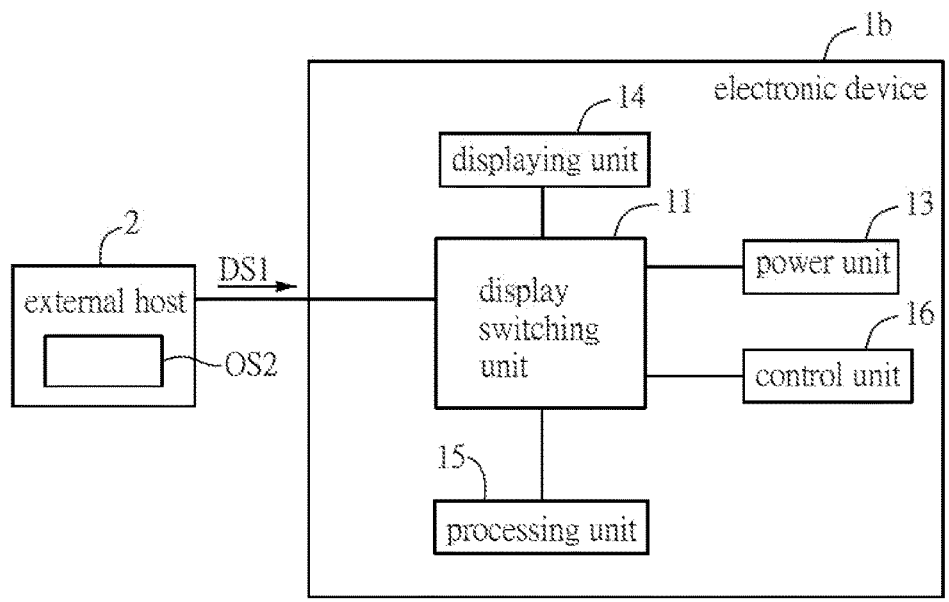
FIG. 4A is a schematic diagram showing the electronic device and the external host according to another embodiment.
Figure 4B:
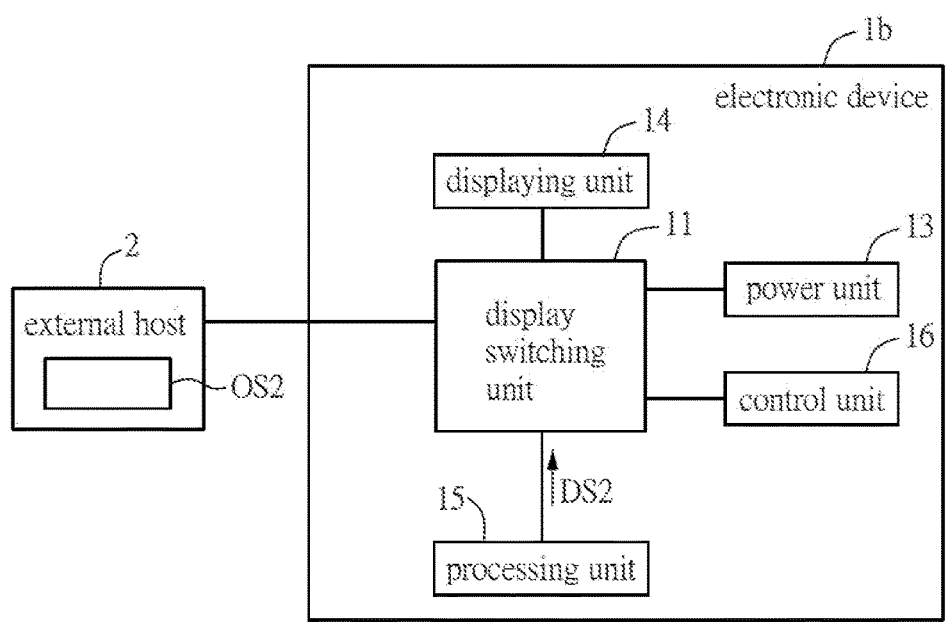
FIG. 4B is a schematic diagram showing another state of the electronic device and the external host in FIG. 4A.

FIG. 3 is a flow chart of the method for preventing the electronic device from entering hibernation according to an embodiment. FIG. 4A is a schematic diagram showing the electronic device 1b and the external host 2 according to another embodiment. FIG. 4B is a schematic diagram showing another state of the electronic device 1b and the external host 2 in FIG. 4A.

The method in FIG. 3 can be applied to the electronic device 1b in FIG. 4A and FIG. 4B. The method prevents the electronic device 1b in FIG. 4A and FIG. 4B from entering hibernation (power state S4). The method can be implemented by a program. The program may be included in the operating system on the electronic device 1b. After the electronic device 1b receives an external display signal DS1 from an external host 2, the method is executed by the control unit 16 of the electronic device 1b. The method comprises:

Step S101: if receiving a sleep instruction, execute the sleep instruction to cause the electronic device to enter sleep mode; and Step S102: if receiving a hibernating instruction, keep the electronic device in sleep mode.

For explanation, please refer to FIG. 4A first. When the display switching unit 11 receives the external display signal DS1 namely the electronic device 1b is in "display mode", the display switching unit 11 outputs a signal to the control unit 16 to inform the control unit 16 that currently the electronic device 1 is in "display mode" (the electronic device 1b is configured to display the user interface of the second operating system OS2). Then, the control unit 16 informs the internal system of entrance of sleep mode (power state S3). Then, the control unit 16 receives a sleep instruction from the internal system and executes the sleep instruction to cause the electronic device 1b to enter sleep mode.

If the electronic device 1b has been in sleep mode more than a designated period of time, the control unit 16 receives a hibernating instruction from the internal system. At the moment, the control unit 16 still keeps the electronic device 1b in sleep mode. Conventionally, if the electronic device 1b has been in sleep mode more than a designated period of time, the internal system enters hibernation (power state S4) for power saving. However, in the embodiment, whether the control unit 16 receives the sleep instruction or the hibernating instruction, the control unit 16 keeps the electronic device 1b always in sleep mode.

Moreover, referring to FIG. 4B, when the display switching unit 11 receives the internal display signal DS2 namely the electronic device 1b runs in "regular working mode", the display switching unit 11 outputs a signal to the control unit 16 to inform the control unit 16 that currently the electronic device 1b is in "regular working mode". Then, the control unit 16 informs the internal system of entrance of working mode power state (power state S0). Then, the control unit 16 receives a working mode instruction from the internal system, and then the control unit 16 controls the electronic device 1 in working mode power state (power state S0).

In summary, when the electronic device according to the embodiments switches to display mode for displaying the user interface of the operating system on the external host, a certain component (e.g. the display switching unit) is prevented from entering hibernation so as to display well, save waking time, save hard disk space and improve working efficiency, etc.

In another embodiment, the method for preventing the electronic device from entering hibernation allows the electronic device to enter sleep mode when receiving the sleep instruction, and keeps the electronic device in sleep mode if the electronic device has been in sleep mode over a long period of time or receives the hibernating instruction. Thus, its system is prevented from entering hibernation so as to save waking time, save hard disk space and improve working efficiency, etc.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An electronic device connecting to an external host, wherein the electronic device is configured to execute a first operating system and the external host is configured to execute a second operating system, the electronic device comprising:

a display switching unit, capable of receiving an external display signal from the external host to output a first switching signal;

a switch unit, coupled to the display switching unit to output a first voltage control signal according to the first switching signal;

a power unit, coupled to the switch unit to output a first voltage to the display switching unit according to the first voltage control signal to cause the electronic device to keep displaying the user interface of the second operating system; and a processing unit, coupled to the display switching unit and capable of outputting an internal display signal to the display switching unit to cause the electronic device to display the user interface of the first operating system, wherein when the display switching unit receives the internal display signal, the display switching unit outputs a second switching signal, the switch unit outputs a second voltage control signal according to the second switching signal, and the power unit outputs a second voltage to the display switching unit according to the second voltage control signal.

2. The electronic device of claim 1, wherein the magnitude of the first voltage is constant.

3. The electronic device of claim 1, wherein the magnitude of the second voltage is variable.

4. The electronic device of claim 1, wherein when the switch unit receives the first switching signal, the switch unit chooses to output the first voltage control signal, when the switch unit receives the second switching signal, the switch unit chooses to output the second voltage control signal.

5. The electronic device of claim 1, wherein when the display switching unit receives the external display signal, the display switching unit outputs the first switching signal but does not output the second switching signal.

6. The electronic device of claim 1, further comprising:

a control unit, coupled to the switch unit, wherein the second voltage control signal comes from the control unit.

7. The electronic device of claim 6, wherein the control unit is an embedded controller.

8. The electronic device of claim 1, wherein the display switching unit is a graphics card or a graphics processing unit.

* * * * *